US010271248B2

(12) United States Patent
Kim et al.

(10) Patent No.: US 10,271,248 B2
(45) Date of Patent: Apr. 23, 2019

(54) SYSTEM AND METHOD FOR PERFORMING HANDOVER OPERATION IN BROADBAND WIRELESS ACCESS COMMUNICATION SYSTEM

(75) Inventors: So-Hyun Kim, Suwon-si (KR); Chang-Hoi Koo, Seongnam-si (KR); Jung-Je Son, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1350 days.

(21) Appl. No.: 12/047,590

(22) Filed: Mar. 13, 2008

(65) Prior Publication Data

US 2008/0159231 A1 Jul. 3, 2008

Related U.S. Application Data

(63) Continuation of application No. 10/795,932, filed on Mar. 8, 2004, now Pat. No. 7,363,038.

(30) Foreign Application Priority Data

Mar. 8, 2003 (KR) .......................... 10-2003-14641

(51) Int. Cl.
*H04W 4/00* (2018.01)
*H04W 36/00* (2009.01)

(52) U.S. Cl.
CPC .............................. *H04W 36/0083* (2013.01)

(58) Field of Classification Search
CPC ......................... H04W 80/04; H04W 36/0083
(Continued)

(56) References Cited

U.S. PATENT DOCUMENTS 5,267,261 A * 11/1993 Blakeney, II ......... H04W 36/30
370/332
5,577,022 A 11/1996 Padovani et al.
(Continued)

FOREIGN PATENT DOCUMENTS

CN 1237838 12/1999
EP 0 888 026 12/1998
(Continued)

OTHER PUBLICATIONS

Chuah et al., "Integrated Dynamic Radio Resource Management", Vehicular Technology Conference, 1995 IEEE 45$^{th}$, vol. 2, Jul. 25-28, 1995, pp. 584-588.
(Continued)

*Primary Examiner* — Guang W Li
(74) *Attorney, Agent, or Firm* — The Farrell Law Firm, P.C.

(57) ABSTRACT

A system and method for performing a handover operation in a broadband wireless access (BWA) communication system. The BWA communication system includes a serving BS (Base Station), (Subscriber Station), and a plurality of neighbor BSs adjacent to the serving BS. The SS handover method upon receiving a handover request from the SS in the BWA communication system includes the steps of: a) receiving from the serving BS information of the plurality of neighbor BSs; b) measuring CINRs (Carrier to Interference and Noise Ratios) of pilot signals transferred from the neighbor BSs upon receipt of the neighbor BSs information; c) transmitting to the serving BS a handover request signal along with pilot signal CINR information of the neighbor BSs; d) upon receipt of the handover request signal, receiving from the serving BS information of a handover enable target BS contained in the neighbor BSs; and e) performing a handover function from the serving BS to the target BS.

18 Claims, 11 Drawing Sheets

(58) Field of Classification Search
USPC .................................................. 370/331–333
See application file for complete search history.

(56) References Cited

U.S. PATENT DOCUMENTS

| | | | |
|---|---|---|---|
| 5,787,346 A * | 7/1998 | Iseyama | H04W 36/0083 370/331 |
| 5,937,019 A | 8/1999 | Padovani | |
| 5,974,320 A * | 10/1999 | Ward | H04W 36/0061 455/432.1 |
| 5,999,816 A * | 12/1999 | Tiedemann, Jr. | H04W 36/0066 455/436 |
| 6,078,570 A * | 6/2000 | Czaja et al. | 370/331 |
| 6,111,864 A * | 8/2000 | Kabasawa | 370/332 |
| 6,119,005 A * | 9/2000 | Smolik | H04B 7/2628 370/320 |
| 6,128,473 A * | 10/2000 | Ritzen | H04W 16/04 455/446 |
| 6,173,181 B1 * | 1/2001 | Losh | 455/434 |
| 6,178,327 B1 * | 1/2001 | Gomez | H04W 24/00 370/216 |
| 6,195,552 B1 | 2/2001 | Jeong et al. | |
| 6,201,968 B1 * | 3/2001 | Ostroff et al. | 455/436 |
| 6,380,809 B1 * | 4/2002 | Camp, Jr. | H03L 7/146 331/17 |
| 6,385,451 B1 * | 5/2002 | Kalliokulju et al. | 455/437 |
| 6,400,951 B1 | 6/2002 | Vaara | |
| 6,405,039 B1 * | 6/2002 | Koorapaty | H04L 1/0059 370/207 |
| 6,449,482 B1 * | 9/2002 | Johansson | H04W 16/12 455/422.1 |
| 6,473,614 B1 * | 10/2002 | Quensel et al. | 455/436 |
| 6,507,570 B1 * | 1/2003 | Holma | H04W 36/0083 370/318 |
| 6,570,861 B1 * | 5/2003 | Marsan et al. | 370/330 |
| 6,577,868 B1 | 6/2003 | Vialen et al. | |
| 6,628,630 B1 * | 9/2003 | Nagase | 370/331 |
| 6,628,632 B1 * | 9/2003 | Dolan | H04W 36/10 370/332 |
| 6,845,238 B1 * | 1/2005 | Muller | H04W 36/18 370/331 |
| 6,853,843 B2 * | 2/2005 | Chen et al. | 455/437 |
| 6,970,708 B1 * | 11/2005 | Raith | 455/440 |
| 6,990,344 B1 | 1/2006 | Dolan et al. | |
| 7,145,890 B1 * | 12/2006 | Seo | H04W 36/04 370/331 |
| 2001/0006515 A1 * | 7/2001 | Lee | H04W 36/0083 370/331 |
| 2001/0024482 A1 * | 9/2001 | Tiedemann, Jr. | H04W 24/10 375/354 |
| 2002/0019231 A1 * | 2/2002 | Palenius | H04W 36/0083 455/437 |
| 2002/0168982 A1 * | 11/2002 | Sorokine | H04W 36/18 455/442 |
| 2003/0003913 A1 * | 1/2003 | Chen | H04W 36/0072 455/436 |
| 2003/0017838 A1 | 1/2003 | Kayama et al. | |
| 2003/0095513 A1 * | 5/2003 | Woodmansee | H04W 68/025 370/324 |
| 2004/0029532 A1 * | 2/2004 | Schwarz | H04W 36/18 455/63.1 |
| 2004/0121770 A1 * | 6/2004 | Tigerstedt | H04W 36/0083 455/436 |
| 2005/0043046 A1 * | 2/2005 | Lee | H04W 36/0072 455/502 |
| 2006/0035639 A1 * | 2/2006 | Etemad et al. | 455/436 |
| 2006/0280142 A1 * | 12/2006 | Damnjanovic | H04B 7/2615 370/329 |
| 2009/0047958 A1 * | 2/2009 | Rimhagen et al. | 455/436 |
| 2009/0219893 A1 * | 9/2009 | Korpela et al. | 370/332 |
| 2009/0221287 A1 * | 9/2009 | Balasubramanian | H04W 48/16 455/434 |
| 2011/0111754 A1 * | 5/2011 | Sharaga et al. | 455/434 |
| 2012/0236776 A1 * | 9/2012 | Zhang et al. | 370/312 |

FOREIGN PATENT DOCUMENTS

| | | |
|---|---|---|
| EP | 0 902 551 | 3/1999 |
| EP | 0 697 163 | 6/2002 |
| JP | 06-077888 | 3/1994 |
| JP | 06-104831 | 4/1994 |
| JP | 07-298340 | 11/1995 |
| JP | 09-261722 | 10/1997 |
| JP | 10-191419 | 7/1998 |
| JP | 11-505980 | 5/1999 |
| JP | 11-308657 | 11/1999 |
| JP | 2000-023229 | 1/2000 |
| JP | 2000-354267 | 12/2000 |
| JP | 2001-054168 | 2/2001 |
| JP | 2002-027519 | 1/2002 |
| JP | 2002-077965 | 3/2002 |
| JP | 2002-084567 | 3/2002 |
| JP | 2002-528976 | 9/2002 |
| JP | 2003-032725 | 1/2003 |
| JP | 2003-108073 | 4/2003 |
| RU | 2150176 | 5/2000 |
| RU | 2197792 | 1/2003 |
| WO | WO 98/06230 | 2/1998 |
| WO | WO 99/43178 | 8/1999 |
| WO | WO 00/27051 | 5/2000 |
| WO | WO 00/51374 | 8/2000 |
| WO | WO 02/19752 | 3/2002 |
| WO | WO 02/032179 | 4/2002 |

OTHER PUBLICATIONS

Chuah et al., "Evaluation of a Minimum Power Handoff Algorithm", Personal, Indoor and Mobile Radio Communications, 1995, PIMRC' 95, Wireless: Merging onto the Information Superhighway, Sixth IEEE International Symposium on, vol. 2, Sep. 27-29, 1995, pp. 814-818.

Meulenhof et al., "Handover in a High-Speed Wireless ATM Based LAN", Vehicular Technology Conference, 1999, IEEE VTS 50$^{th}$, vol. 3, Sep. 19-22, 1999, pp. 1730-1734.

Kitroser, "IEEE 802.16e Handoff Draft", Mar. 2003.

Itzik Kitroser et al., "IEEE802.16E Mobility Enhancements", Jan. 14, 2003.

* cited by examiner

SYSTEM AND METHOD FOR PERFORMING HANDOVER OPERATION IN BROADBAND WIRELESS ACCESS COMMUNICATION SYSTEM

PRIORITY

This application is a continuation application of U.S. patent application Ser. No. 10/795,932, filed on Mar. 8, 2004, now U.S. Pat. No. 7,363,038 and claims priority to an application entitled "SYSTEM AND METHOD FOR PERFORMING HANDOVER OPERATION IN BROADBAND WIRELESS ACCESS COMMUNICATION SYSTEM", filed in the Korean Intellectual Property Office on Mar. 8, 2003 and assigned Ser. No. 2003-14641, the contents of which are incorporated herein by reference.

BACKGROUND OF THE INVENTION

1. Field of the Invention

The present invention relates to a broadband wireless access communication system, and more particularly to a system and method for performing a handover operation upon receipt of an SS (Subscriber Station) request in a BWA (Broadband Wireless Access) communication system using an OFDM (Orthogonal Frequency Division Multiplexing) scheme.

2. Description of the Related Art

Intensive research is being conducted into the 4G (4th Generation) communication system, one of the next generation communication systems, to provide a plurality of users with specific services having a variety of QoSs (Quality of Services) at a transfer rate of about 100 Mbps. Presently, the 3G (3rd Generation) communication system provides a transfer rate of about 384 kbps in an outdoor channel environment having a relatively poor channel environment, and provides a maximum transfer rate of about 2 Mbps in an indoor channel environment having a relatively good channel environment. A wireless Local Area Network (LAN) system and a wireless Metropolitan Area Network (MAN) system have been designed to provide a transfer rate of 20~50 Mbps. The 4G communication system provides the wireless LAN and MAN systems a relatively high transfer rate with mobility and QoS, and many secondary developers are conducting intensive research into high-speed services to be provided from the 4G communication system.

However, the wireless MAN system is suitable for a high-speed communication service in that it has a wide coverage area and supports a high-speed transfer rate, but it does not consider the mobility of a subscriber station (SS) at all, so that there is no consideration of the need for a handover operation (i.e., a cell selection operation) caused by the movement of the SS. The communication system currently considered in IEEE (Institute of Electrical and Electronics Engineers) 802.16a specification acts as a specific communication system for performing a ranging operation between the SS and a base station (BS). The communication system considered in the IEEE 802.16a specification will hereinafter be described with reference to FIG. 1.

FIG. 1 is a block diagram illustrating a BWA communication system using an OFDM/OFDMA (Orthogonal Frequency Division Multiplexing/Orthogonal Frequency Division Multiple Access) scheme. In more detail, FIG. 1 depicts the IEEE 802.16a communication system.

The wireless MAN system acting as a BWA communication system has a much wider coverage area and a much higher transfer rate than the wireless LAN system. In case of adapting the OFDM scheme and the OFDMA scheme to a physical channel of the wireless MAN system to provide the wireless MAN system with a broadband transmission network, this application system is referred to as an IEEE 802.16a communication system. The IEEE 802.16a communication system applies the OFDM/OFDMA scheme to the wireless MAN system, such that it transmits a physical channel signal using a plurality of sub-carriers, resulting in high-speed data transmission. The IEEE 802.16e communication system has been designed to consider the mobility of an SS in the IEEE 802.16a communication system. There is no detailed specification for the IEEE 802.16e communication system.

Referring to FIG. 1, the IEEE 802.16a communication system has a single cell structure, and is composed of a BS 100 and a plurality of SSs 110, 120, and 130 managed by the BS 100. Signal transmission/reception among the BS 100 and the SSs 110, 120, and 130 can be established using the OFDM/OFDMA scheme. A downlink frame structure for use in the IEEE 802.16a communication system will hereinafter be described with reference to FIG. 2.

FIG. 2 is a conceptual diagram illustrating the downlink frame structure for use in the BWA communication system using the OFDM/OFDMA scheme. In more detail, FIG. 2 depicts a downlink frame structure for use in the IEEE 802.16a communication system.

Referring to FIG. 2, the downlink frame includes a preamble field 200, a broadcast control field 210, and a plurality of TDM (Time Division Multiplexing) fields 220 and 230. A synchronous signal (i.e., a preamble sequence) for acquiring synchronization between the BS and the SSs is transmitted via the preamble field 200. The broadcast control field 210 is composed of a DL(DownLink)_MAP field 211 and a UL(UpLink)_MAP field 213. The DL_MAP field 211 is adapted to transmit the DL_MAP message, and a plurality of IEs (Information Elements) contained in the DL_MAP message are shown in the following Table 1:

TABLE 1

| Syntax | Size | Notes |
| --- | --- | --- |
| DL_MAP_Message_Format( ){ | | |
| Management Message Type=2 | 8 bits | |
| PHY Synchronization Field | Variable | See appropriate PHY specification |
| DCD Count | 8 bits | |
| Base Station ID | 48 bits | |
| Number of DL_MAP Element n | 16 bits | |
| Begin PHY Specific section { | | See applicable PHY section |
| for (I=1; i<=n; i++) | | For each DL_MAP element 1 to n |
| DL_MAP Information Element( ) | Variable | See corresponding PHY specification |
| if! (byte boundary) { | | |
| Padding Nibble | 4 bits | Padding to reach byte boundary |
| } | | |
| } | | |
| } | | |
| } | | |

With reference to the above Table 1, the DL_MAP message includes a Management Message Type field indicative of a plurality of IEs (i.e., transmission message type information); a PHY (PHYsical) Synchronization field established in response to a modulation or demodulation scheme applied to a physical channel in order to perform synchronization acquisition; a DCD count field indicative of count information in response to a DCD (Downlink Channel Descriptor) message configuration variation containing a downlink burst profile; a Base Station ID field indicative of a Base Station Identifier; and a Number of DL_MAP Element n field indicative of the number of elements found after the Base Station ID. Particularly, the DL_MAP message (not shown in Table 1) includes information associated with ranging codes allocated to individual ranging processes to be described later.

The UL_MAP field 213 is adapted to transmit the UL_MAP message, and a plurality of IEs contained in the UL_MAP message are shown in the following Table 2:

TABLE 2

| Syntax | Size |
|---|---|
| UL_MAP_Message_Format( ){ | |
|     Management Message Type=3 | 8 bits |
|     Uplink Channel ID | 8 bits |
|     UCD Count | 8 bits |
|     Number of UL_MAP Element n | 16 bits |
|     Allocation Start Time | 32 bits |
|     Begin PHY Specific section { | |
|         for (i=1; i<n; i+n) | |
|             UL_MAP Information_Element( ) | Variable |
|                 Connection ID | |
|                 UIUC | |
|                 Offset | |
|         } | |
|     } | |
| } | |

With reference to Table 2, the UL_MAP message includes a Management Message Type field indicative of a plurality of IEs (i.e., transmission message type information); an Uplink Channel ID field indicative of a used Uplink Channel ID; a UCD (Uplink Channel Descriptor) count field indicative of count information in response to a UCD message configuration variation containing an uplink burst profile; and a Number of UL_MAP Element n field indicative of the number of elements found after the UCD count field. In this case, the uplink channel ID can only be allocated to a Media Access Control (MAC) sub-layer.

The UIUC (Uplink Interval Usage Code) area records information indicative of the usage of offsets recorded in the offset area. For example, provided that 2 is recorded in the UIUC area, a starting offset for use in the initial ranging process is recorded in the offset area. Provided that 3 is recorded in the UIUC area, a starting offset for use in either the bandwidth request ranging or the maintenance ranging process is recorded in the offset area. The offset area records a starting offset value for use in either the initial ranging process or the maintenance ranging process according to the information recorded in the UIUC area. Physical channel characteristic information to be transferred from the UIUC area is recorded in the UCD.

Provided that the SS results in a ranging failure, a predetermined backoff value is set up to increase the probability of success in the next trial, and the ranging process is re-performed after the lapse of a predetermined time corresponding to the backoff time. In this case, information needed for determining the backoff value is contained in the UCD message. The aforementioned UCD message configuration is shown in the following Table 3:

TABLE 3

| Syntax | Size | Notes |
|---|---|---|
| UCD-Message_Format( ){ | | |
|   Management Message Type=0 | 8 bits | |
|   Unlink channel ID | 8 bits | |
|   Configuration Change Count | 8 bits | |
|   Mini-slot size | 8 bits | |
|   Ranging Backoff Start | 8 bits | |
|   Ranging Backoff End | 8 bits | |
|   Request Backoff Start | 8 bits | |
|   Request Backoff End | 8 bits | |
|   TLV Encoded Information for the overall channel | Variable | |
|   Begin PHY Specific Section { | | |
|     for (i=1; i<n; i+n) | | |
|       Uplink_Burst_Descriptor | Variable | |
|       } | | |
|     } | | |
| } | | |

With reference to the Table 3, the UCD message includes a Management Message Type field indicative of a plurality of IEs (i.e., transmission message type information); an Uplink Channel ID field indicative of a used Uplink Channel Identifier; a Configuration Change Count field counted by the BS; a mini-slot size field indicative of the number of mini-slots of the uplink physical channel; a Ranging Backoff Start field indicative of a backoff start point for an initial ranging process, i.e., an initial backoff window size for the initial ranging process; a Ranging Backoff End field indicative of a backoff end point for the initial ranging process, i.e., a final backoff window size; a Request Backoff Start field indicative of a backoff start point for establishing contention data and requests, i.e., an initial backoff window size; and a Request Backoff End field indicative of a backoff end point for establishing contention data and requests, i.e., a final backoff window size. In this case, the backoff value indicates a kind of standby time which is a duration time between the start of SS's access failure and the start of SS's re-access time. If the SS fails to execute an initial ranging process, the BS must transmit the backoff values indicative of standby time information for which the SS must wait for the next ranging process to the SS. For example, provided that a specific number of 10 is determined by the "Ranging Backoff Start" and "Ranging Backoff End" fields shown in Table 3, the SS must pass over $2^{10}$ access executable chances (i.e., 1024 access executable chances) and then execute the next ranging process according to a Truncated Binary Exponential Backoff Algorithm.

The TDM fields 220 and 230 indicate fields corresponding to timeslots allocated using a TDM/TDMA (Time Division Multiplexing/Time Division Multiple Access) scheme. The BS transmits broadcast information to be broadcast to SSs managed by the BS over the DL_MAP field 211 using a predetermined center carrier. The SSs monitor all the frequency bands having been previously allocated to individual SSs upon receipt of a power-on signal, such that they detect a pilot channel signal having the highest signal intensity, i.e., the highest pilot CINR (Carrier to Interference and Noise Ratio). It is determined that the SS belongs to a specific BS which has transmitted the pilot channel signal with the highest pilot CINR. The SSs check the DL_MAP field 211 and the UL_MAP field 213 of the downlink frame having been transmitted from the BS, such that they recognize their own uplink and downlink control information and specific information indicative of a real data transmission/reception position.

The downlink frame structure for use in the IEEE 802.16a communication system has been disclosed with reference to FIG. 2. An uplink frame structure for use in the IEEE 802.16a communication system will hereinafter be described with reference to FIG. 3.

FIG. 3 is a conceptual diagram illustrating an uplink frame structure for use in a BWA communication system using an OFDM/OFDMA scheme. In more detail, FIG. 3 depicts an uplink frame structure for use in the IEEE 802.16a communication system.

Prior to describing the uplink frame structure shown in FIG. 3, three ranging processes for use in the IEEE 802.16a communication system, i.e., an initial ranging process, a maintenance ranging process (also called a period ranging process), and a bandwidth request ranging process will hereinafter be described in detail.

First, the initial ranging process will be described in detail.

The initial ranging process for establishing synchronization acquisition between the BS and the SS establishes a correct time offset between the SS and the BS, and is adapted to control a transmission power (also called a transmit power). In more detail, the SS is powered on, and receives the DL_MAP message, the UL_MAP message, and the UCD message to establish synchronization with the BS in such a way that it performs the initial ranging process to control the transmission power between the BS and the time offset. In this case, the IEEE 802.16a communication system uses the OFDM/OFDMA scheme, such that the ranging procedure requires a plurality of ranging sub-channels and a plurality of ranging codes. The BS allocates available ranging codes to the SS according to objectives of the ranging processes (i.e., the ranging process type information). This operation will hereinafter be described in detail.

The ranging codes are created by segmenting a PN (Pseudorandom Noise) sequence having a length of $2^{15}-1$ bits into predetermined units. Typically, one ranging channel is composed of two ranging sub-channels each having a length of 53 bits, PN code segmentation is executed over the ranging channel having the length of 106 bits, resulting in the creation of a ranging code. A maximum of 48 ranging codes RC#1~RC#48 can be assigned to the SS. More than two ranging codes for every SS are applied as a default value to the three ranging processes having different objectives, i.e., an initial ranging process, a period ranging process, and a bandwidth request ranging process. In this way, a ranging code is differently assigned to the SS according to each objective of the three ranging processes. For example, N ranging codes are assigned to the SS for the initial ranging process as denoted by a prescribed term of "N RC (Ranging Codes) for Initial Ranging", M ranging codes are assigned to the SS for the periodic ranging process as denoted by a prescribed term of "M RCs for maintenance ranging", and L ranging codes are assigned to the SS for the bandwidth request ranging process as denoted by a prescribed term of "L RCs for BW-request ranging". The assigned ranging codes are transmitted to the SSs using the DL_MAP message, and the SSs perform necessary ranging procedures using the ranging codes contained in the DL_MAP message.

Second, the period ranging process will be described in detail.

The period ranging process is periodically executed such that an SS which has controlled a time offset between the SS and the BS, and a transmission power in the initial ranging process can control a channel state associated with the BS. The SS performs the period ranging process using the ranging codes assigned for the period ranging process.

Third, the bandwidth request ranging process will be described.

The bandwidth request ranging process is adapted to enable the SS, which has controlled a time offset between the SS and the BS, and a transmission power in the initial ranging process, to request a bandwidth allocation from the BS in such a way that the SS can communicate with the BS.

Referring to FIG. 3, the uplink frame includes an initial maintenance opportunity field 300 using the initial and period ranging processes, a request contention opportunity field 310 using the bandwidth request ranging process, and an SS scheduled data field 320 composed of uplink data of a plurality of SSs. The initial maintenance opportunity field 300 includes a plurality of access burst fields each having real initial and period ranging processes, and a collision field in which there is a collision between the access burst fields. The request contention opportunity field 310 includes a plurality of bandwidth request fields each having a real bandwidth request ranging process, and a collision field in which there is a collision between the bandwidth request ranging fields. The SS scheduled data fields 320 are each composed of a plurality of SS scheduled data fields (i.e., SS 1 scheduled data field~SS N scheduled data field). The SS transition gap is positioned between the SS scheduled data fields (i.e., SS 1 scheduled data field~SS N scheduled data field).

FIG. 3 has disclosed the uplink frame structure for the IEEE 802.16a communication system. A ranging procedure for the IEEE 802.16a communication system using an OFDM scheme will hereinafter be described with reference to FIG. 4.

FIG. 4 is a flow chart illustrating the ranging procedure between the SS and the BS in a BWA communication system using the OFDM scheme.

Referring to FIG. 4, the SS 400 monitors all of its own predetermined frequencies upon receipt of a power-on signal, such that it detects a pilot channel signal having the highest signal intensity, i.e., the highest pilot CINR (Carrier to Interference and Noise Ratio). It is determined that SS 400 belongs to a specific BS 420 which has transmitted the pilot channel signal with the highest pilot CINR. The SS 400 receives a downlink frame preamble from the BS 420, such that it acquires system synchronization with the BS 420.

Upon establishing synchronization between the SS 400 and the BS 420, the BS 420 transmits the DL_MAP message and the UL_MAP message to the SS 400 at steps 411 and 413, respectively. As previously shown in Table 1, the DL_MAP message includes a variety of information, for example, requisite information for establishing synchronization between the SS 400 and the BS 420 in a downlink direction and configuration information of a physical channel capable of receiving a variety of messages transmitted to a plurality of SSs 400 over a downlink channel. As previously shown in Table 2, the UL_MAP message informs the SS 400 of SS scheduling interval information and physical channel configuration information, etc.

The DL_MAP message is periodically broadcast from the BS to all the SSs. In the case where the SS 400 can continuously receive the periodically-broadcast DL_MAP message, it is assumed that the SS is synchronized with the BS. The SSs receiving the DL_MAP message can receive all the messages transmitted over a downlink channel.

As stated above in Table 3, if the SS results in an access failure, the BS transmits the UCD message containing available backoff value indication information to the SS.

In case of performing the above ranging process, the SS 400 transmits an RNG_REQ (Ranging Request) message to the BS 420 at step 415. The BS 420 receiving the RNG_REQ message transmits an RNG_RSP (Ranging Response) message containing information for controlling a variety of factors (e.g., frequency, time, and transmission power) to the SS 400 at step 417.

The RNG_REQ message configuration is shown in the following Table 4:

TABLE 4

| Syntax | Size | Notes |
|---|---|---|
| RNG-REQ_Message_Format( ){ | | |
| Management Message Type=4 | 8 bits | |
| Downlink Channel ID | 8 bits | |
| Pending Until Complete | 8 bits | |
| TLV Encoded Information | Variable | TLV specific |

With reference to Table 4, the Downlink Channel ID field indicates a downlink channel ID contained in the RNG-REQ message received in the SS via the UCD. The Pending Until Complete field indicates priority information of a transmission ranging response. In more detail, if the Pending Until Complete field is set to "0", a previous ranging response has priority. Otherwise, if the Pending Until Complete field is not set to "0", a current transmission ranging response has priority.

A detailed configuration of the RNG_RSP message to the RNG_REQ message shown in Table 4 is shown in Table 5:

TABLE 5

| Syntax | Size | Notes |
|---|---|---|
| RNG_RSP_Message_Format( ){ | | |
| Management Message Type=5 | 8 bits | |
| Uplink Channel ID | 8 bits | |
| TLV Encoded Information | Variable | TLV specific |

With reference to Table 5, the Uplink Channel ID field indicates an uplink channel ID contained in the RNG_REQ message.

FIG. 4 has disclosed the ranging process when the IEEE 802.16a communication system uses the OFDM scheme. A ranging procedure for the IEEE 802.16a communication system using the OFDMA scheme will hereinafter be described with reference to FIG. 5. In this case, the IEEE 802.16a communication system contains a dedicated ranging interval in order to enable the IEEE 802.16a communication system to more effectively perform the ranging process using the OFDMA scheme, so that it may transmit the Ranging-Code instead of the RNG_REQ message according to a ranging code transmission scheme in the dedicated ranging interval.

Referring to FIG. 5, the BS 520 transmits the DL_MAP message and the UL_MAP message to the SS 500 at steps 511 and 513, respectively. Detailed operations of steps 511 and 513 are equal to those of steps 411 and 413. The communication system using the OFDMA scheme of FIG. 5 transmits a ranging code instead of the RNG-REQ message having been described in FIG. 4 at step 515. The BS 520 receiving the ranging code transmits the RNG_RSP message to the SS 500 at step 517.

New information must be added to the RNG_RSP message such that information corresponding to the ranging code transmitted to the BS can be recorded in the RNG_RSP message. The aforementioned new information to be added to the RNG_RSP message is composed of a ranging code (i.e., a received ranging CDMA code), a ranging symbol (i.e., an OFDM symbol in the received ranging CDMA code), a ranging sub-channel (i.e., a ranging sub-channel in the received ranging CDMA code), and a ranging frame number (i.e., a frame number in the received ranging CDMA code).

As described above, the IEEE 802.16a communication system operates on the basis of a fixed state of a current SS (i.e., there is no consideration given to the mobility of the SS) and a single cell structure. However, the IEEE 802.16e communication system has been defined as a system for considering the SS's mobility in the IEEE 802.16a communication system, such that the IEEE 802.16e communication system must consider the SS's mobility in a multi-cell environment. In order to provide the SS's mobility in the multi-cell environment, individual operating modes of the SS and the BS must be converted. However, the IEEE 802.16e communication system has not proposed a new method for the SS's mobility in the multi-cell environment. In conclusion, a handover system considering both an idle state and a communication service execution mode must be developed to provide mobility to an SS in a IEEE 802.16e communication system.

SUMMARY OF THE INVENTION

Therefore, the present invention has been made in view of the above problems, and it is an object of the present invention to provide a system and method for performing a handover operation in a BWA communication system.

It is another object of the present invention to provide a system and method for performing a handover operation upon receipt of an SS request signal in a BWA communication system.

In accordance with one aspect of the present invention, the above and other objects can be accomplished by the provision of a subscriber station (SS) handover method upon receiving a handover request from the SS in a BWA (Broadband Wireless Access) communication system comprised of a serving BS (Base Station) and a plurality of neighbor BSs adjacent to the serving BS, comprising the steps of: a) receiving from the serving BS information relating to the plurality of neighbor BSs; b) measuring CINRs (Carrier to Interference and Noise Ratios) of pilot signals transferred from the neighbor BSs upon receipt of the information relating to the neighbor BSs; c) transmitting a handover request signal to the serving BS along with pilot signal CINR information of the neighbor BSs; d) upon receipt of the handover request signal, receiving from the serving BS information of a target BS inform among the neighbor BSs; and e) performing a handover function from the serving BS to the target BS.

In accordance with another aspect of the present invention, there is provided a serving BS (Base Station) handover method upon receiving a handover request from an SS (Subscriber Station) in a BWA (Broadband Wireless Access) communication system comprised of a serving BS and a plurality of neighbor BSs adjacent to the serving BS, comprising the steps of: a) transmitting to the SS information relating to the neighbor BSs; b) receiving from the SS a handover request signal containing CINR (Carrier to Interference and Noise Ratio) information of pilot signals of the neighbor BSs; c) determining if the neighbor BSs contained in the handover request signal can support a handover function for the SS, and selecting a target BS acting as a handover target of the SS from among neighbor BSs capable of supporting the handover function for the SS; and d) transmitting a response signal associated with the handover request signal of the SS along with the target BS information, and informing the target BS of a handover ready state of the SS.

In accordance with yet another aspect of the present invention, there is provided an SS (Subscriber Station) handover method upon receiving a handover request from the SS in a BWA (Broadband Wireless Access) communication system comprised of a serving BS (Base Station) and a plurality of neighbor BSs adjacent to the serving BS, comprising the steps of: a) receiving from the serving BS information relating to the plurality of neighbor BSs and handover condition information; b) measuring CINRs (Carrier to Interference and Noise Ratios) of pilot signals transferred from the neighbor BSs upon receipt of the neighbor BSs information; c) selecting a plurality of candidate BSs corresponding to the handover condition information from among the neighbor BSs, and transmitting a handover request signal to the serving BS along with pilot signal CINR information of the candidate BSs; d) upon receipt of the handover request signal, receiving from the serving BS information of a target BS from among the candidate BSs; and e) performing a handover function from the serving BS to the target BS.

In accordance with yet another aspect of the present invention, there is provided a handover method upon receiving a handover request from an SS (Subscriber Station) in a BWA (Broadband Wireless Access) communication system comprised of a serving BS (Base Station) and a plurality of neighbor BSs adjacent to the serving BS, comprising the steps of: a) controlling the serving BS to transmit to the SS information of the neighbor BSs and handover condition information; b) controlling the SS to measure CINRs (Carrier to Interference and Noise Ratios) of pilot signals transferred from the neighbor BSs according to the neighbor BSs information; c) controlling the SS to determine a plurality of candidate BSs corresponding to handover condition information from among the neighbor BSs, and transmitting to the serving BS a handover request signal along with pilot signal CINR information of the candidate BSs; d) if the serving BS receives the handover request signal from the SS, determining if the neighbor BSs contained in the handover request signal can support a handover function for the SS, and selecting a target BS acting as a handover target of the SS from among candidate BSs capable of supporting the handover function for the SS; e) controlling the serving BS to transmit a response signal associated with the handover request signal to the SS along with the target BS information, and informing the target BS of a handover ready state of the SS; and f) controlling the SS to perform a handover operation from the serving BS to the target BS according to the target BS information contained in the handover request response signal.

In accordance with yet another aspect of the present invention, there is provided a handover apparatus upon receiving a handover request from the SS (Subscriber Station) in a BWA (Broadband Wireless Access) communication system comprised of a serving BS (Base Station) and a plurality of neighbor BSs adjacent to the serving BS, comprising: the serving BS, which transmits information of the neighbor BSs and handover condition information to the SS, determines if the neighbor BSs contained in the handover request signal can support a handover function for the SS upon receiving the handover request signal from the SS, selects a target BS acting as a handover target of the SS from among candidate BSs capable of supporting the handover function for the SS, transmits a response signal associated with the handover request signal to the SS along with the target BS information, and informs the target BS of a handover ready state of the SS; and the SS, which measures CINRs (Carrier to Interference and Noise Ratios) of pilot signals transferred from the neighbor BSs according to the neighbor BSs information, selects a plurality of candidate BSs corresponding to handover condition information from among the neighbor BSs, transmits a handover request signal to the serving BS along with pilot signal CINR information of the candidate BSs, and performs a handover operation from the serving BS to the target BS according to the target BS information contained in the handover request response signal.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
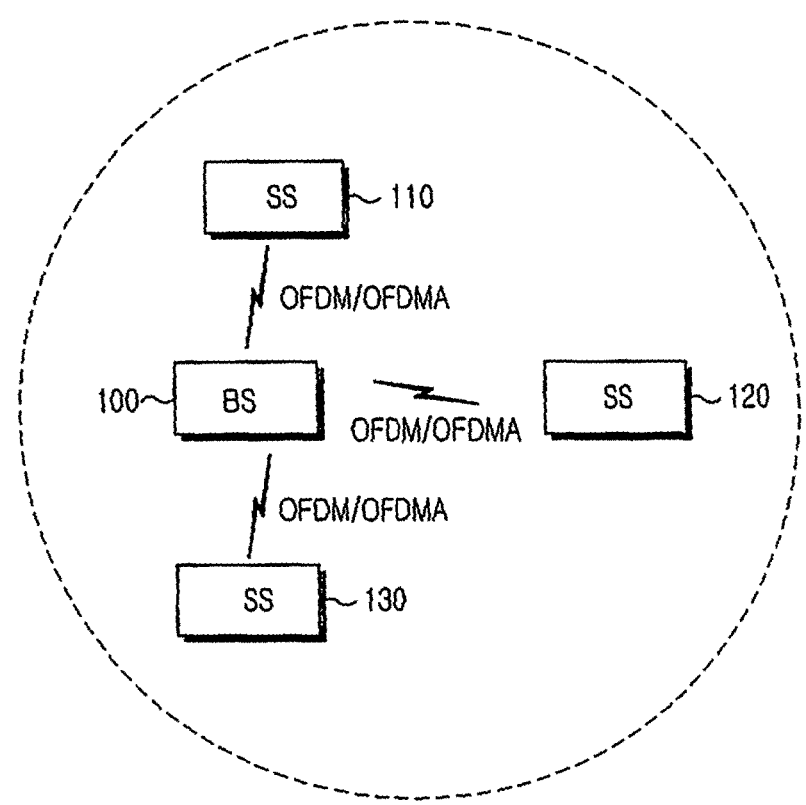
FIG. 1 is a block diagram illustrating a conventional BWA (Broadband Wireless Access) communication system using an OFDM/OFDMA scheme.
Figure 2:
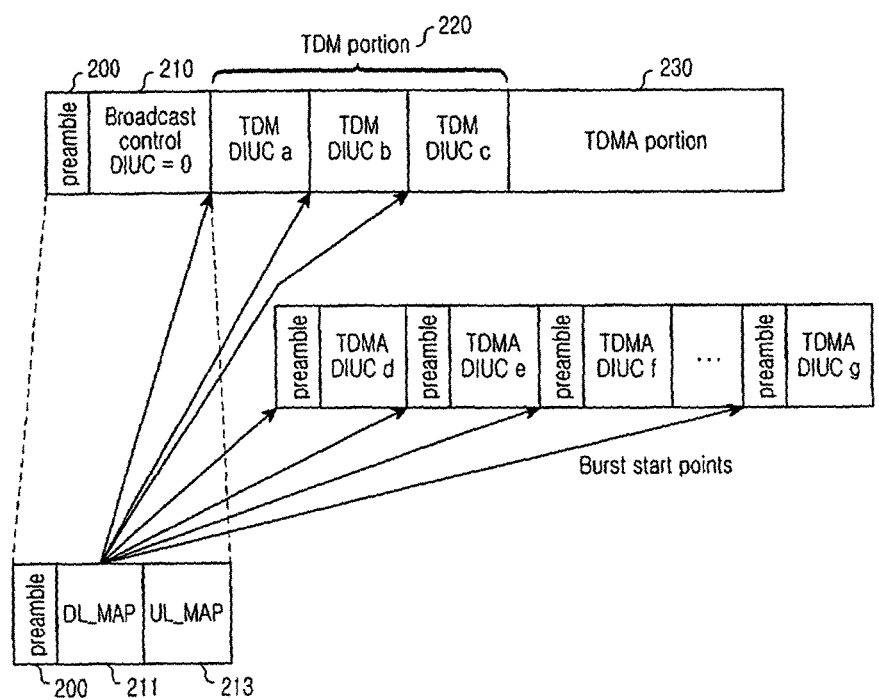
FIG. 2 is a conceptual diagram illustrating a conventional downlink frame structure for use in a BWA communication system using an OFDM/OFDMA scheme.
Figure 3:
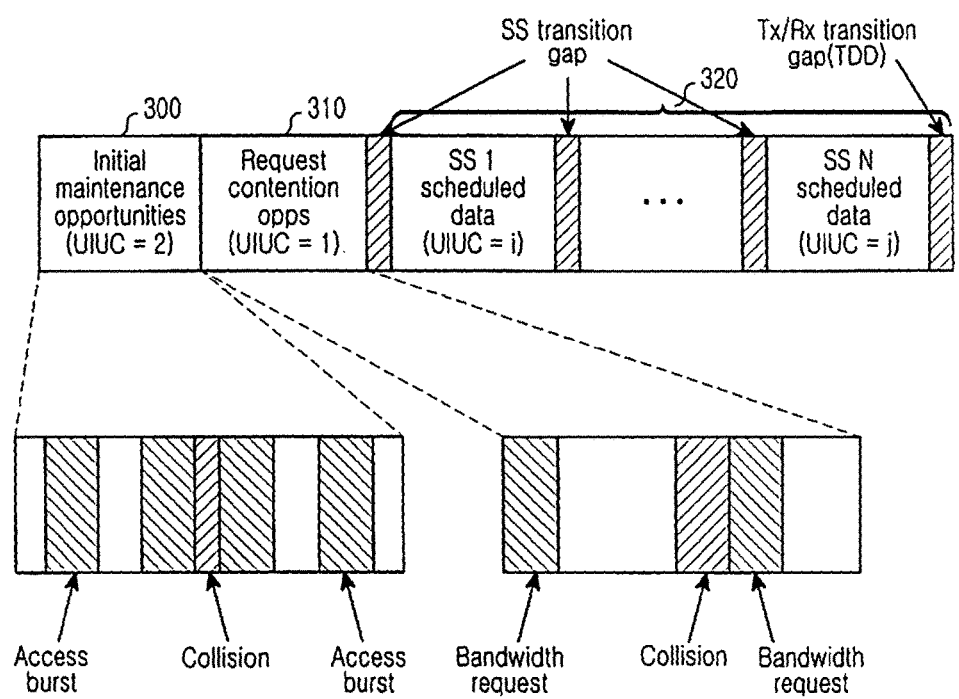
FIG. 3 is a conceptual diagram illustrating a conventional uplink frame structure for use in a BWA communication system using an OFDM/OFDMA scheme.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may obscure the subject matter of the present invention.

Figure 6:
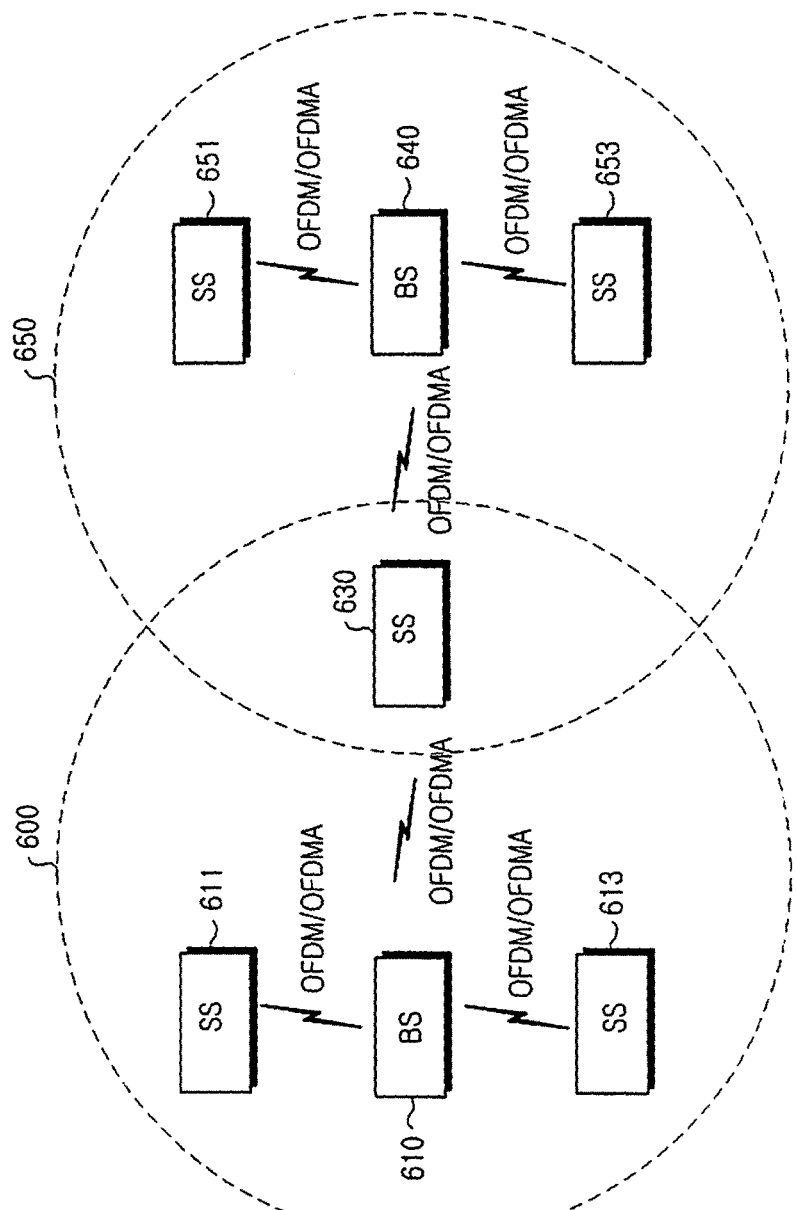
FIG. 6 is a block diagram illustrating a BWA communication system using an OFDM/OFDMA scheme to perform a variety of functions in accordance with a preferred embodiment of the present invention.

FIG. 6 is a block diagram illustrating a BWA communication system using an OFDM/OFDMA scheme to perform a variety of functions in accordance with a preferred embodiment of the present invention.

Prior to describing the BWA communication system shown in FIG. 6, it is noted that the present invention adapts the IEEE 802.16e communication system using an OFDM/OFDMA scheme as a representative example. It is also noted that an IEEE 802.16e communication system acting as a communication system for considering the mobility of an SS in the IEEE 802.16a communication system has not been developed yet. Provided that the SS's mobility is considered in the IEEE 802.16a communication system, it is possible to consider the multi-cell structure and an SS's handover operation (i.e., a cell selection operation) between the multi-cells. Therefore, the present invention provides the IEEE 802.16e communication system as shown in FIG. 6.

Referring to FIG. 6, the IEEE 802.16e communication system includes a multi-cell structure, i.e., a plurality of cells 600 and 650. In more detail, the IEEE 802.16e communication system includes a first BS 610 for managing the cell 600, a second BS 640 for managing the cell 650, and a plurality of SSs 611, 613, 630, 651, and 653. Signal transmission/reception among the BSs 610 and 640 and the SSs 611, 613, 630, 651, and 653 is established using the OFDM/OFDMA scheme. Among the subscriber stations 611, 613, 630, 651,and 653, the subscriber station 630 is located in a boundary region, or a handover region, between the cell 600 and the cell 650. Therefore, it is necessary to support a handover of the subscriber station 630 in order to support mobility of the subscriber station 630.

In general, and according to an embodiment of the present invention an SS for use in the BWA communication system receives a plurality of signals from a plurality of BSs. The SS detects individual CINRs (Carrier to interference and Noise Ratios) of the received pilot signals. The SS selects a specific BS, which has transmitted a pilot channel having the highest CINR from among CINRs of the pilot signals, and determines the selected BS to be a serving BS (i.e., an active BS) to which the SS belongs. In more detail, the SS selects a BS having the best reception state from among a plurality of BSs transmitting the pilot signals, and recognizes the selected BS as its own serving BS. For the convenience of description, the term "Active BS" or "Serving BS" may be employed in the present invention for illustrative purposes.

The SS which has selected the active BS receives a downlink frame and a uplink frame from the active BS. The detailed configurations of the downlink frame and the uplink frame received from the active BS have been disclosed in the prior art, so that they will herein be omitted for the convenience of description. The present invention must add new IEs (Information Elements) to the DL_MAP message provided from the IEEE 802.16a/IEEE 802.16e communication system in such a way that it can support a handover operation upon receiving a request from the SS. A detailed configuration of the DL_MAP message for supporting the handover operation upon receipt of the SS's request is shown in the following Table 6:

TABLE 6

| MAC management message | Parameter | Multi | Content |
|---|---|---|---|
| | Neighbor list BS Num | Common | Number of Neighbor list BSs |
| | Neighbor list Info | 1 to Neighbor list BS Num | |

TABLE 6-continued

| MAC management message | Parameter | Multi | Content |
|---|---|---|---|
| | Neighbor list BS ID | | IDs of Neighbor list BSs |
| | Neighbor Frequency | | Frequencies of Neighbor BSs |
| | Neighbor Frequency offset | | Frequency offsets of Neighbor BSs |
| | Neighbor Frame offset | | Frequency offsets of Neighbor list BSs |
| | Measurement Info Pilot min CINR | Common | Minimum value containable in Neighbor list |
| | MAX_T | | Maximum time during which BSs contained in Neighbor list remain below pilot min CINR |
| | MIN_T | | Minimum time during which BS having the highest pilot CINR among BSs in the Neighbor list remains at a value higher than pilot CINR of active BS |

With reference to the above Table 6, the number of neighbor BSs (denoted by "Neighbor list BS Num") indicates the number of neighbor BSs contained in the neighbor list. The neighbor list field indicates the list of neighbor BSs of the active BS. The Neighbor list Info field indicates neighbor BSs contained in the neighbor list, i.e., a plurality of neighbor BSs from a first neighbor BS to the last neighbor BS. The neighbor list information denoted by "Neighbor list Info" includes a Neighbor list BS ID field, a Neighbor Frequency field, a Neighbor Frequency Offset field, and a Neighbor Frame Offset field. The Neighbor list BS ID field indicates IDs of individual BSs contained in the neighbor list. The Neighbor Frequency field indicates a center frequency of a corresponding neighbor BS. The Neighbor Frequency Offset field indicates a frequency offset of a corresponding neighbor BS. The neighbor frame offset field indicates a frame offset of a corresponding neighbor BS. The Measurement Info field includes a minimum pilot signal CINR (Pilot min CINR) field, a maximum time (MAX_T) field and a minimum time (MIN_T) field. The Pilot min CINR field is adapted as a reference for selecting neighbor BSs containable in the Neighbor list Info field from among a plurality of BSs of the IEEE 802.16e communication system. In more detail, only BSs transmitting pilot signals each higher than the Pilot min CINR can be adapted as neighbor BSs contained in the neighbor list. The MAX_T field indicates a maximum time for enabling each neighbor BS to have a pilot signal CINR of less than the Pilot min CINR. In more detail, the neighbor BSs must transmit pilot signals higher than the Pilot min CINR. If the pilot signal less than the Pilot min CINR is transmitted during the MAX_T time, a corresponding neighbor BS is removed from the neighbor list. In this way, if the neighbor BS capable of transmitting the pilot signal having the Pilot min CINR during the MAX_T time has been removed from the neighbor list, there is no need for the SS to measure an unnecessary pilot CINR. The MIN_T time indicates a minimum time during which the highest pilot CINR from among a plurality of pilot CINRs of the neighbor BSs must be higher than a pilot CINR of the active BS. In more detail, in order to control the SS to be handed over from the active BS to a specific neighbor BS (i.e., a target BS), a CINR of a pilot signal transmitted from the target BS must be higher than that of the other pilot signal transmitted from the active BS during more than the MIN_T time. The MIN_T is set in order to prevent a ping-pong phenomenon in which the subscriber station sends a handover request to the base station each time a CINR of a received pilot channel is higher than a CINR of the active base station. In this case, it should be noted that the MAX_T time and the MIN_T time may be differently determined according to state and channel condition information of individual BSs in the IEEE 802.16e communication system.

A ranging request step during which the SS having received the DL_MAP message and the UL_MAP message requests the ranging process from the active BS and a ranging response step during which a response signal to the ranging request is transmitted to the SS which has transmitted the ranging request are equal to those of the prior art, such that their detailed description will herein omitted for the convenience of description. The SS having successfully established the ranging process wirelessly communicates with the active BS. The handover process in response to the SS request signal during the wireless access communication time between the SS and the active BS will hereinafter be described with reference to FIG. 7.

Figure 7:
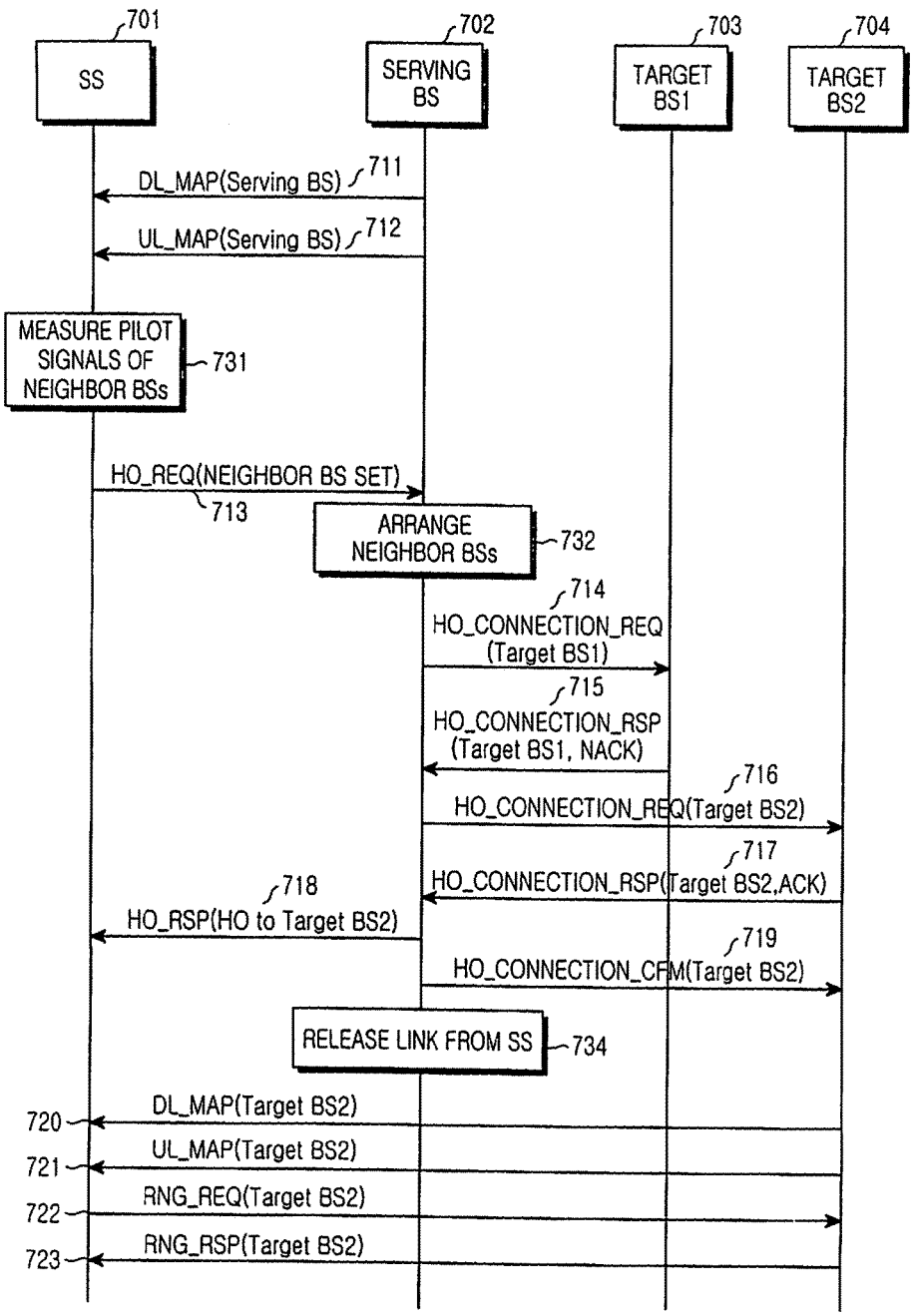
FIG. 7 is a flow chart illustrating a handover procedure upon receiving a handover request from an SS in a BWA communication system using an OFDM scheme in accordance with a preferred embodiment of the present invention.

FIG. 7 is a flow chart illustrating the handover procedure upon receiving a handover request from the SS in the IEEE 802.16e communication system using the OFDM scheme in accordance with a preferred embodiment of the present invention.

Referring to FIG. 7, upon establishing system synchronization between an SS 701 and a serving BS (also called an active BS) 702, the serving BS 702 transmits the DL_MAP message and the UL_MAP message to the SS 701 at steps 711 and 712, respectively. The DL_MAP message format and the UL_MAP message format have been disclosed in Table 6 and Table 2, respectively, such that their detailed description will herein be omitted. The SS 701 receives the DL_MAP message to detect information of neighbor BSs of the SS 701, such that the SS 701 measures CINRs of the pilot signals received from the neighbor BSs at step 731.

The SS 701 temporarily stops receiving transmission data of the serving BS 702. In more detail, the SS 701 measures CINRs of the pilot signals received from the neighbor BSs during a reception interrupt time of the transmission data of the serving BS 702. In this case, the SS 701 does not measure individual CINRs of the pilot signals received from all the neighbor BSs contained in the neighbor list contained in the DL_MAP message, and is adapted to measure only CINRs of pilot channel signals received from the neighbor BSs excluded by the MIN_T time. The method for measuring the CINRs of the pilot signals received from the neighbor BSs will be described in detail.

The SS 701 establishes synchronization with individual neighbor BSs using a variety of information of neighbor BSs contained in the neighbor list of the DL_MAP message. Upon establishing synchronization with the neighbor BSs, the SS 701 measures CINRs of pilot signals received from the neighbor BSs.

The SS 701 having measured the CINRs of the pilot signals received from the neighbor BSs determines whether it is handed over to another BS instead of the serving BS 702. The handover determination step of the SS 701 will be described in detail. At least one of the CINRs of pilot signals received from the neighbor BSs must satisfy the MAX_T condition. Provided that the CINRs of the pilot signals received from the neighbor BSs contained in the neighbor list are less than the minimum pilot CINR denoted by "Pilot min CINR" during more than the MAX_T time, corresponding pilot signals are removed from the neighbor list, such that the MAX_T condition must be satisfied. In this case, the neighbor BSs which have satisfied the MAX_T condition are each called a candidate BS (i.e., a target BS). If the MAX_T condition has been satisfied, the SS 701 determines whether CINRs of pilot signals transmitted from the neighbor BSs are greater than a CINR of a pilot signal received from the serving BS 702. If it is determined that the pilot signal CINR received from the serving BS 702 is greater than individual CINRs of the pilot signals received from the neighbor BSs, the SS 702 does not request the handover operation from the serving BS 702. Otherwise, if it is determined that the pilot signal CINR received from the serving BS 702 is less than CINRs of the pilot signals received from the neighbor BSs, the SS 701 requests the handover operation from the serving BS 702. Needless to say, the SS 701 requests the handover operation from the serving BS 702 on the condition that a neighbor BS satisfying the MIN_T condition is found. The reason why the SS 701 requests the handover operation from the serving BS 702 on the condition that the MIN_T time condition has been satisfied is to prevent the aforementioned pingpong phenomenon from being generated.

If the handover operation has been determined, the SS 701 transmits a handover request (HO_REQ) message to the serving BS 702 at step 713. The HO_REQ message format is shown in Table 7:

TABLE 7

| MAC management message | Parameter | Multi | Content |
|---|---|---|---|
| HO_REQ | Uplink Channel ID | common | Uplink channel ID contained in message |
| | Neighbor list BS carrier frequency | 1 to Neighbor list BS Num | carrier frequencies of neighbor BSs |
| | CINR of neighbor list BS | | Pilot CINRs of Neighbor list BSs |
| | QoS | common | Service category information of MS |
| | BW request | common | BW Information of MS |

Prior to describing Table 7, it should be noted that neighbor BSs act as target BSs after receiving a handover request from the SS 701, such that they are the same as the target BSs after the SS has generated the handover request. Referring to Table 7, the Neighbor list BS carrier frequency field indicates carrier frequencies of neighbor BSs (i.e., target BSs) which have received the handover request from the SS 701. The CINR of neighbor list BS field indicates CINRs of pilot signals transmitted from the neighbor BSs. The QoS field indicates a quality of service (QoS) desired by the SS 701. The BW request field indicates a bandwidth requested in response to the QoS desired by the SS 701. In this case, the QoS is composed of a variety of service grades, i.e., an Unsolicited Grant Service (UGS), a Real-Time Polling Service (rtPS), a Non-Real-Time Polling Service (nrtPS), and a Best Effort Service (BE). The serving BS 702 having received the handover request message from the SS 701 arranges neighbor BSs contained in the handover request message. There are a variety of possible methods for arranging the neighbor BSs. As stated above, the CINR of the neighbor BS which stops measuring the CINR of the pilot signal using the SS 701 is set to "0". The serving BS 702 may configure information of the arranged neighbor BSs in the form of a list, and may store the list-formatted information.

The serving BS 702 arranging the neighbor BSs sequentially transmits an HO_CONNECTION_REQ (Handover Connection Request) message to corresponding neighbor BSs (i.e., target BSs) according to the arranged order of the neighbor BSs at steps 714 and 716. The HO_CONNECTION_REQ message format is shown in the following Table 8:

TABLE 8

| MAC management message | Parameter | Multi | Content |
|---|---|---|---|
| HO_CONNECTION_REQ | Target BS ID | common | Target BS ID |
| | CID | common | Terminal CID in Serving BS |
| | QoS | common | Service category information of MS |
| | BW request | common | BW to be assigned to MS |

With reference to Table 8, the Target BS ID indicates ID information of the target BS. The CID (Connection ID) is a connection CID assigned from the serving BS 702 to the SS 701. The QoS field indicates a quality of service (QoS) desired by the SS 701. The BW request field indicates a bandwidth requested in response to the QoS desired by the SS 701. The reason why the serving BS 702 transmits the HO_CONNECTION_REQ message to the target BSs (i.e., a target BS 1 703 and a target BS2 704) is to determine whether or not a QoS and a bandwidth associated with the service desired by the SS 701 can be satisfied.

If the target BSs 703 and 704 receive the HO_CONNECTION_REQ message, they transmit the HO_CONNECTION_RSP (Handover Connection Response) message to the serving BS 702 at steps 715 and 717. A representative example of the HO_CONNECTION_RSP message format is shown in the following Table 9:

TABLE 9

| MAC management message | Parameter | Multi | Content |
|---|---|---|---|
| HO_CONNECTION_RSP | Target BS ID | common | Target BS ID |
| | CID | common | Terminal CID in Serving BS |
| | ACK/NACK | common | HO approval or disapproval |

With reference to Table 9, the Target BS ID field indicates ID information of the target BS transmitting the HO_CONNECTION_RSP, the CID is a connection ID used for the serving BS 702 of the SS 701. The ACK/NACK field indicates HO (handover) approval or disapproval information of the SS 701. In more detail, in the case where the ACK message is contained in the HO_CONNECTION_RSP message, a corresponding target BS is able to provide the SS 701 with a handover function. In the case where the NACK message is contained in the HO_CONNECTION_RSP message, a corresponding target BS is unable to provide the SS 701 with the handover function. As shown in FIG. 7, the target BS1 703 transmits the HO_CONNECTION_RES message containing the NACK field indicative of an handover support disable state for the SS 701. It is assumed that the target BS2 704 transmits the HO_CONNECTION_RSP message containing the ACK field indicative of a handover support enable state for the SS 701.

The HO_CONNECTION_REQ message and the HO_CONNECTION_RSP message are sequentially transmitted as shown in FIG. 7, but they may also be transmitted simultaneously if needed.

Upon receiving the HO_CONNECTION_RSP message from the target BSs, the serving BS 702 detects the ACK/NACK field contained in the received HO_CONNECTION_RSP message, such that it sets the target BS (i.e., the target BS2 704) which has transmitted the HO_CONNECTION_RSP message containing the ACK field to a last target BS to which the SS 701 is handed over. Thereafter, the serving BS 702 transmits the HO_RSP (Handover Response) message containing the last target BS information to the SS 701 at step 718. The HO_RSP message includes information of the last target BS to which the SS 701 is handed over. A representative example of the HO_RSP message is shown in Table 10:

TABLE 10

| MAC management message | Parameter | Multi | Content |
|---|---|---|---|
| HO_RSP | Target BS ID | common | Target BS ID |
| | Target BS carrier frequency | common | Carrier frequency of Target BS |

With reference to Table 10, the Target BS ID field indicates ID information of the last target BS to which the SS 701 is handed over. The Target BS carrier frequency field indicates a carrier frequency of the last target BS. The serving BS 702 having transmitted the HO_RSP message transmits an HO_CONNECTION_CFM (Handover Connection Confirmation) message to the last target BS (i.e., the target BS2 704) at step 719. In this case, the HO_CONNECTION_CFM message indicating that the SS 701 will be handed over to the last target BS 704 is transmitted. A representative example of the HO_CONNECTION_CFM message is shown in Table 11:

TABLE 11

| MAC management message | Parameter | Multi | Content |
|---|---|---|---|
| HO_CONNECTION_CFM | Target BS ID | common | Target BS ID |
| | CID | common | Terminal CID in Serving BS |

With reference to Table 11, the Target BS ID field indicates ID information of a neighbor BS (i.e., the last target BS) receiving the HO_CONNECTION_CFM message. The CID indicates a connection ID assigned from the serving BS 702 to the SS 701. The serving BS 702 having transmitted the HO_CONNECTIN_CFM message to the target BS2 704 releases a link connected to the SS 701 at step 734.

Figure 4:
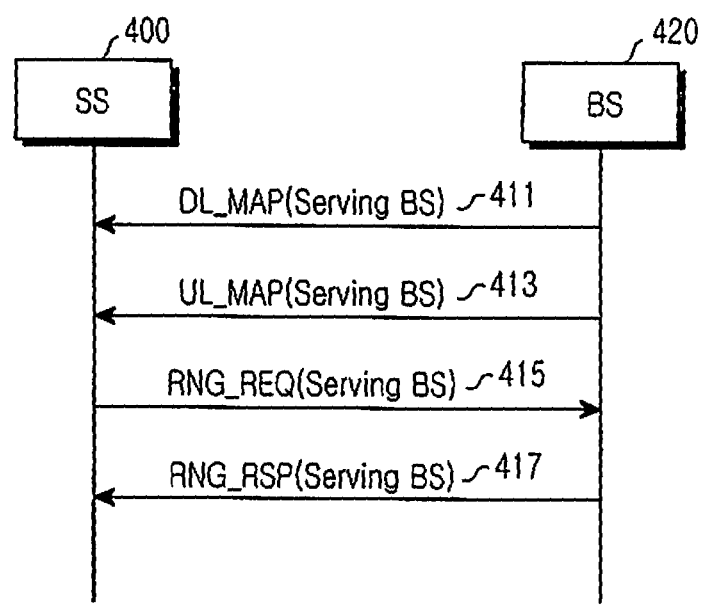
FIG. 4 is a flow chart illustrating a conventional ranging process between an SS and a BS in a BWA communication system using an OFDM scheme.
Figure 5:
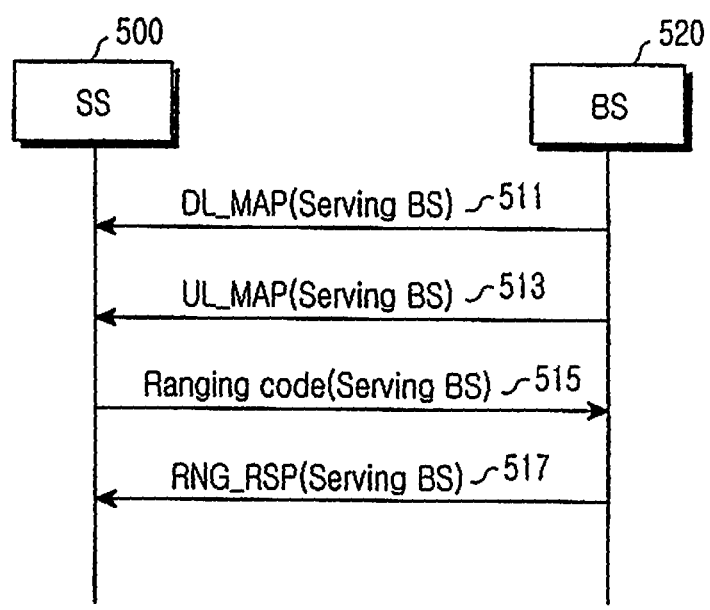
FIG. 5 is a flow chart illustrating a conventional ranging process between an SS and a BS in a BWA communication system using an OFDMA scheme.

The target BS2 704 transmits the DL_MAP message and the UL_MAP message to the SS 701 at steps 720 and 721, respectively. The DL_MAP message and the UL_MAP message include updated information of the SS 701. The SS 701 having received the DL_MAP message and the UL_MAP message transmits an RNG_REQ (Ranging Request) message to the target BS2 704 at step 722. The target BS2 704 having received the RNG_REQ message transmits the RNG_RSP message acting as a response message associated with the RNG_REQ message to the SS 701 at step 723. A detailed process performed in the steps 720 to 723 is identical to the process performed in the steps 411 to 417 illustrated in FIG. 4. Therefore, a detailed description of these steps will not be given again herein.

Figure 8:
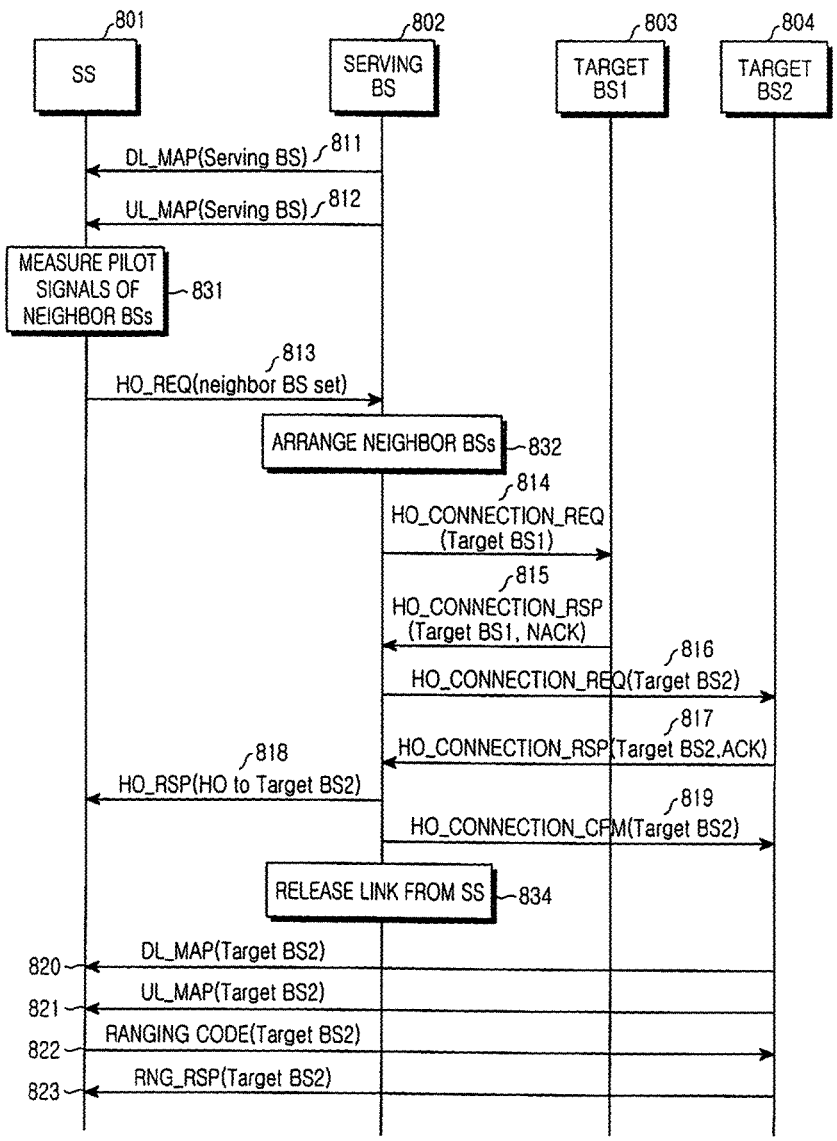
FIG. 8 is a flow chart illustrating a handover procedure upon receiving a handover request from an SS in a BWA communication system using an OFDMA scheme in accordance with a preferred embodiment of the present invention.

FIG. 7 has disclosed the handover procedure upon receiving a handover request from the SS in the IEEE 802.16e communication system using the OFDM scheme. FIG. 8 is a flow chart illustrating a handover procedure upon receiving a handover request from the SS in the IEEE 802.16e communication system using the OFDMA scheme in accordance with a preferred embodiment of the present invention.

Prior to describing FIG. 8 in detail, it should be noted that steps 811 to 821 and steps 831 to 834 shown in FIG. 8 are equal to steps 711 to 721 and steps 731 to 734 shown in FIG. 7, respectively, such that their detailed description will herein be omitted. Because the OFDMA scheme is applied to FIG. 8, the SS 801 transmits a ranging code instead of the RNG_REQ message to the last target BS (i.e., the target BS2 804) at step 822. The target BS2 804 having received the ranging code transmits the RNG_RSP message acting as a response associated with the ranging code to the SS 801 at step 823. In more detail, the handover procedure of FIG. 7 is substantially equal to that of FIG. 8, however, the IEEE 802.16e communication system transmits the RNG_REQ message according to the OFDM scheme in FIG. 7 scheme whereas it transmits the ranging code according to the OFDMA scheme in FIG. 8. FIG. 8 has disclosed the handover procedure upon receipt of a handover request from the SS in the IEEE 802.16e communication system using the OFDMA scheme. The SS internal configuration for performing inventive functions will hereinafter be described with reference to FIG. 9.

Figure 9:
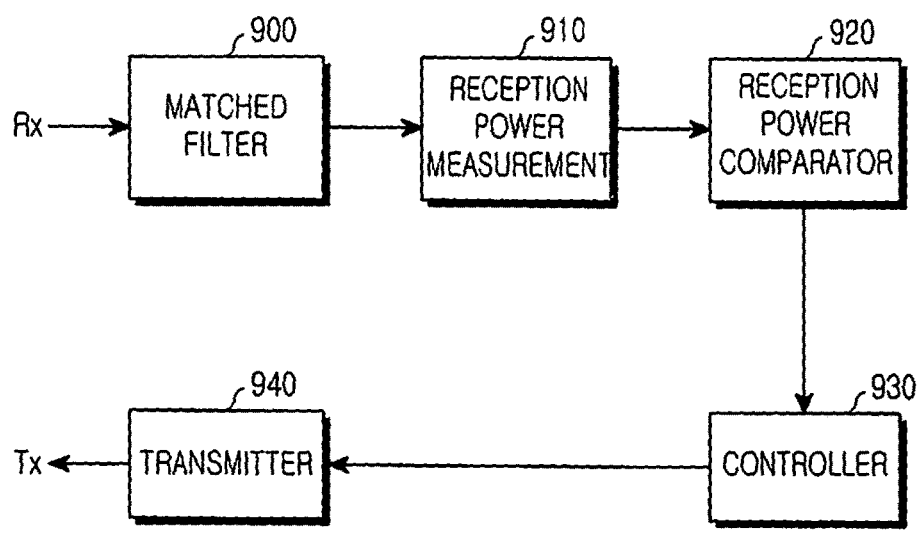
FIG. 9 is a block diagram illustrating an internal configuration of the SS for performing inventive functions in accordance with a preferred embodiment of the present invention.

FIG. 9 is a block diagram illustrating the SS internal configuration for performing inventive functions in accordance with a preferred embodiment of the present invention. Referring to FIG. 9, the SS internal configuration includes a matched filter 900, a reception power measurement unit 910, a reception power comparator 920, a controller 930, and a transmitter 940. The matched filter 900 determines whether a PN (Pseudo Noise) code for synchronization detection is synchronized or not, and outputs a predetermined energy value according to the determined result. In this case, the correlator may also be adapted as the matched filter 900. The matched filter 900 compares the received synchronization detection PN code with a unique PN code of the SS, and outputs the energy value in association with the same PN code. In more detail, the matched filter 900 sequentially enters a reception signal of the SS in a predetermined window, and performs a predetermined bit operation in parallel to the unique PN code value, resulting in the sum of the bit-operation values. Therefore, if the reception signal of the SS is equal to the unique PN code value stored in the SS, this condition is called an auto-correlation state, such that a maximum energy value is generated. If the SS reception signal is different from the unique PN code value, this condition is called an inconsistent synchronization state, such that a relatively low energy value is generated. Typically, the output energy values are compared with a predetermined threshold value so that it is determined whether the auto-correlation state is established. In conclusion, the output value of the matched filter 900 is compared with the predetermined threshold value so that the presence or absence of the auto-correlation state can be determined.

If the reception power measurement unit 910 is synchronized with a pilot signal received from each neighbor BS via the matched filter, the reception power measurement Unit 910 measures the reception power of the received pilot signal. The reception power measurement unit 910 measures the CINR of the received pilot signal, and transmits the measured CINR of the pilot signal to the reception power comparator 920. Upon receiving CINRs of the pilot signals from the reception power measurement unit 910, the reception power comparator 920 compares the received pilot signal CINRs of the neighbor BSs with a predetermined threshold value (i.e., a Pilot min CINR). If at least one pilot signal CINR from among pilot signal CINRs transmitted from the neighbor BSs is greater than the threshold value, the reception power comparator 920 goes to the next step. In more detail, it is determined whether at least one pilot signal CINR from among the neighbor BSs' pilot signal CINRs is greater than a pilot signal CINR of the serving BS. If it is determined that a neighbor BS having a pilot signal CINR greater than that of the serving BS is found, information of a neighbor BS having the pilot signal CINR greater than that of the serving BS is transmitted to the controller 930. The controller 930 determines whether the SS transmits its own handover request to the serving BS according to information received from the reception power comparator 920.

In more detail, if the CINRs of the pilot signals transmitted from the neighbor BSs are greater than that of the other pilot signal transmitted from the serving BS, the controller 930 generates a handover request signal of the SS. In this case, although there is no description in the drawings, it should be noted that the MAX_T and MIN_T conditions must be satisfied in the handover request process. The controller 930 generates a handover request (HO_REQ) message by controlling the transmitter 940, and transmits the generated handover request message to the serving BS. The transmitter 940 generates the HO_REQ message upon receiving a control command from the controller 930, and transmits the HO_REQ message to the serving BS.

Figure 10:
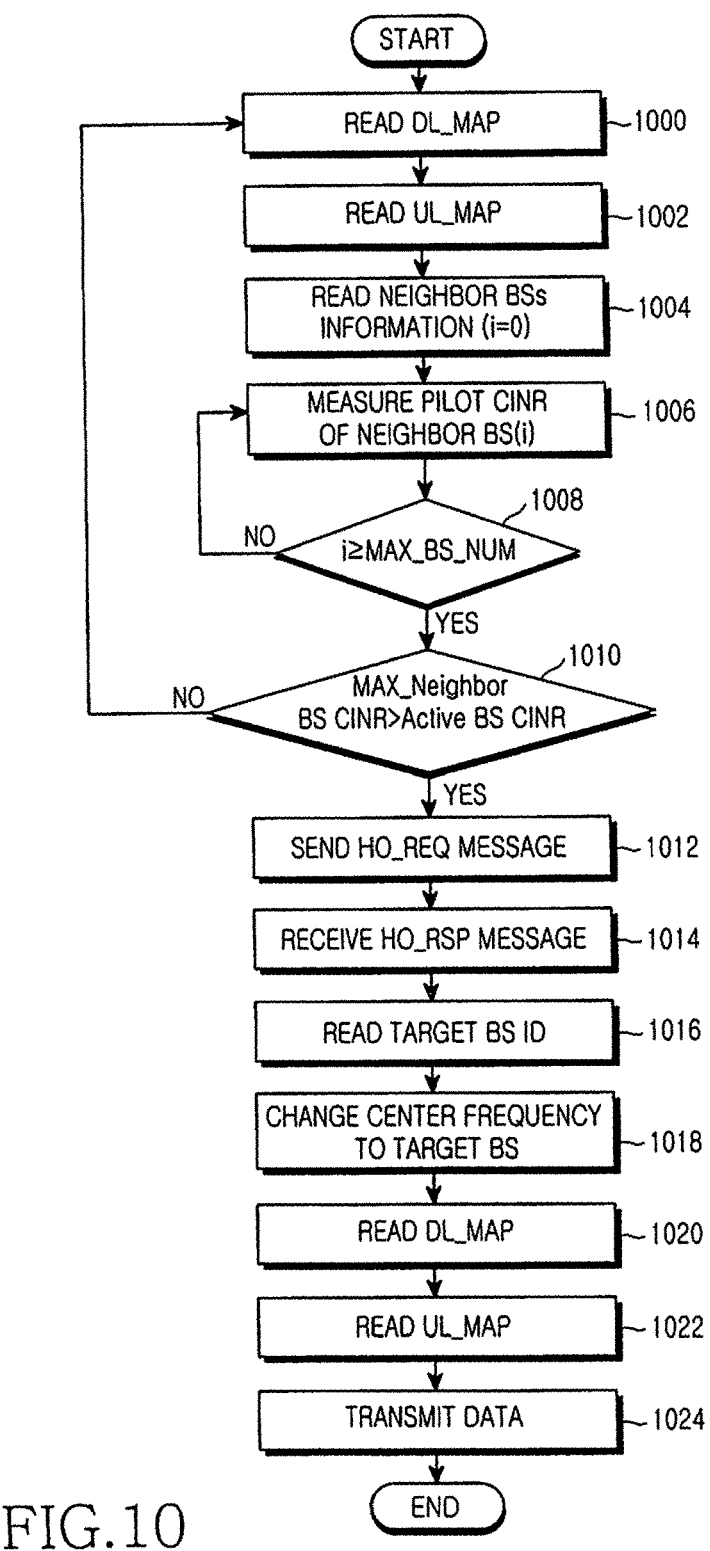
FIG. 10 is a flow chart illustrating operations of the SS in accordance with a preferred embodiment of the present invention.

FIG. 9 has disclosed the SS internal configuration according to the present invention. Operations of the SS will hereinafter be described with reference to FIG. 10. FIG. 10 is a flow chart illustrating operations of the SS in accordance with a preferred embodiment of the present invention. Referring to FIG. 10, the SS reads the DL_MAP message received from the serving BS at step 1000, reads the UL_MAP message received from the serving BS at step 1002, and reads the neighbor BS list information contained in the DL_MAP message at step 1004. If the SS reads the neighbor BSs information at step 1004, it sets an ID "i" indicative of the number of the neighbor BSs to "0" (i.e., i=0) at step 1004.

The SS adds a number of 1 to a variable "i" (i.e., i=i+1), measures a CINR of a pilot signal transmitted from the i-th neighbor BS at step 1006, and goes to step 1008. In this case, it is assumed that the neighbor BSs' number transmitted from the serving BS is in the range from "BS_1" to "MAX BS_NUM". Therefore, the SS measures a pilot signal CINR for the neighbor BSs' number "BS_1" at step 1006, and determines whether the number of the neighbor BS having measured the pilot signal CINR is equal to or greater than "MAX_BS_NUM" at step 1008. If it is determined the number of the measured neighbor BS is equal to or greater than "MAX_BS_NUM" at step 1008, the SS goes to step 1010. Otherwise, if it is determined that the number of the measured neighbor BS is less than "MAX_BS_NUM" at step 1008, the SS returns to step 1006.

If it is determined that the value of MAX_Neighbor BS CINR is equal to or less than the pilot signal CINR of the serving BS, the SS returns to step 1000. Otherwise, if it is determined that the value of MAX_Neighbor BS CINR is greater than the pilot signal CINR of the serving BS, the SS determines its own handover request, and goes to step 1012.

The SS transmits the HO_REQ message to the serving BS at step 1012. The detailed configuration of the HO_REQ message has been disclosed in the aforementioned Table 7. The SS receives the HO_RSP message associated with the HO_REQ message from the serving BS at step 1014, and goes to step 1016. The detailed configuration of the HO_RSP message has been disclosed in the aforementioned Table 10. The SS reads ID and carrier frequency information of the last target BS from among the HO_RSP message at step 1016, and goes to step 1018. In this case, the last target BS acts as a specific BS to which the SS is handed over.

The SS converts an SS frequency into a target BS frequency, and goes to step 1020, such that data transmission/reception between the SS and the serving BS is interrupted and the SS can communicate with the last target BS. The SS reads the DL_MAP message received from the last target BS at step 1020, and goes to step 1022. The SS reads the UL_MAP message received from the last target BS, and goes to step 1024. The SS communicates with the last target BS at step 1024, and terminates its handover operation.

Figure 11:
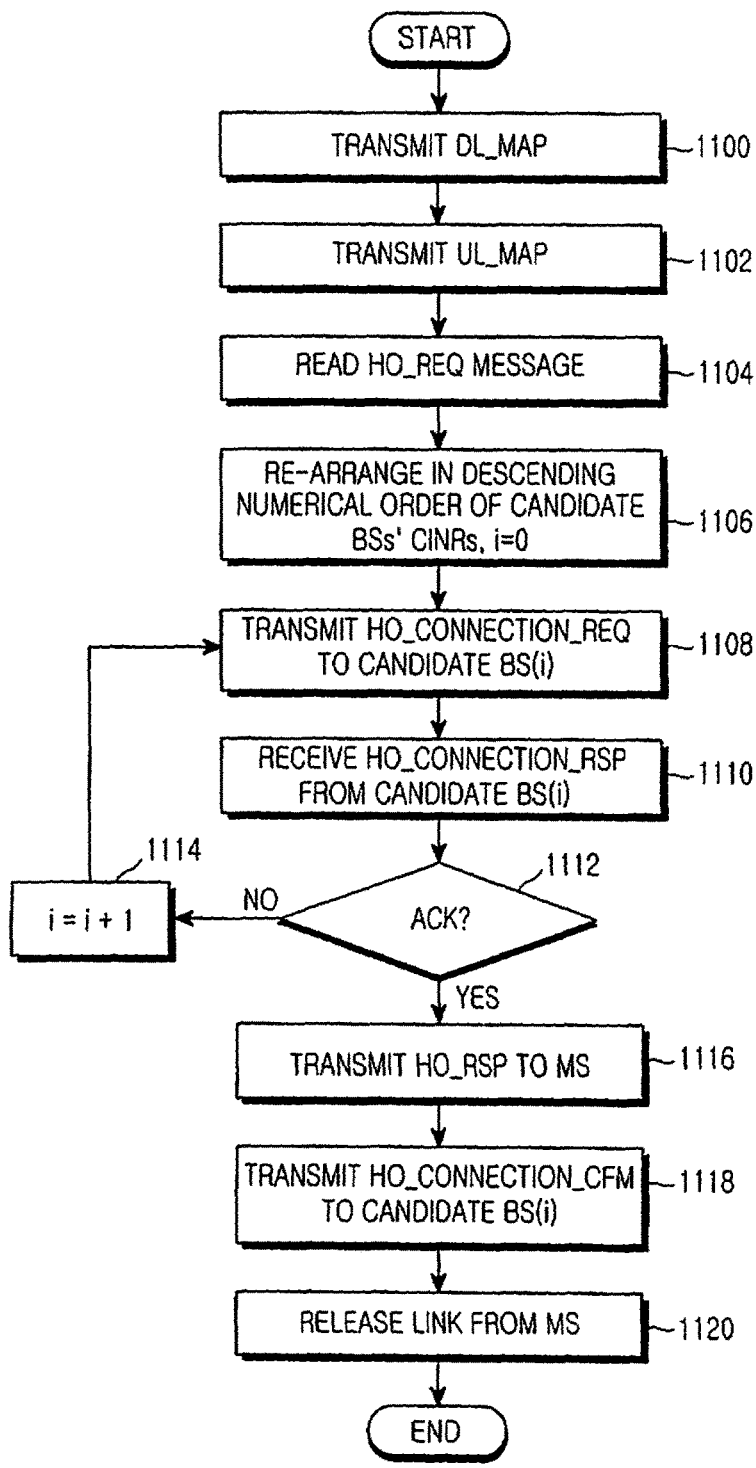
FIG. 11 is a flow chart illustrating operations of a serving BS in accordance with a preferred embodiment of the present invention.

FIG. 10 has disclosed operations of the SS according to the present invention. Operations of the serving BS will hereinafter be described with reference to FIG. 11. FIG. 11 is a flow chart illustrating operations of a serving BS in accordance with a preferred embodiment of the present invention. The serving BS transmits the DL_MAP message to the SS at step 1100, and transmits the UL_MAP message to the SS at step 1102.

The serving BS receives the HO_REQ message from the SS at step 1104, and goes to step 1106. The detailed configuration of the HO_REQ message has been disclosed in the aforementioned Table 7. The serving BS arranges CINRs of the pilot signals of the neighbor BSs in other of descending magnitude, and goes to step 1108. In this case, the CINRs of the pilot signals of the neighbor BSs are contained in the HO_REQ message. As stated above, the neighbor BSs for commanding the SS to measure the pilot signal CINR act as candidate BSs which satisfy the MAX_T and MIN_T conditions, such that each candidate BS has a signal greater than a Pilot min CINR (i.e., a minimum pilot signal CINR). As previously stated in FIG. 10, it is assumed that the number of neighbor BSs of the SS is in the range from BS_1 to MAX_BS_NUM. In addition, the ID "i" indicative of the number of the neighbor BSs is set to "0" (i.e., i=0) at step 1106. The ID indicative of the number "i" of the neighbor BSs is determined in the order of the pilot CINRs.

The serving BS transmits the HO_CONNECTION_REQ message to the neighbor BS having the greatest pilot CINR from among the arranged neighbor BSs at step 1108. The detailed configuration of the HO_CONNECTION_REQ message has been shown in the aforementioned Table 8.

The serving BS receives the HO_CONNECTION_RSP message indicative of a response to the HO_CONNECTION_REQ message from the neighbor BS which have transmitted the HO_CONNECTION_REQ message at step 1110, and goes to step 1112. The detailed configuration of the HO_CONNECTION_RSP message has been disclosed in the aforementioned Table 9. The serving BS determines whether there is a neighbor BS capable of supporting a handover function of the SS in a plurality of neighbor BSs transmitting the SS handover request signals. In more detail, the serving BS determines whether the ACK message is contained in the HO_CONNECTION_RSP message. If it is determined that a specific neighbor BS from among the neighbor BSs can support the handover service for the SS, the serving BS goes to step 1116. Otherwise, if it is determined that none of the neighbor BSs is able to support the handover service for the SS, the serving BS goes to step 1114. The serving BS selects a neighbor BS with the second greatest pilot CINR from among the neighbor BSs and increases the variable "i" by one (i.e., i=i+1) at step 1114, and returns to step 1108.

The serving BS transmits the HO_RSP message to the SS at step 1116, and goes to step 1118. The detailed configuration of the HO_RSP message has been disclosed in the aforementioned Table 10. The serving BS transmits the HO_CONNECTION_CFM message to a neighbor BS (i.e., the last target BS) capable of supporting the handover function at step 1118, and returns to step 1120. The detailed configuration of the HO_CONNECTION_CFM message has been disclosed in the aforementioned Table 11. Needless to say, the serving BS may first transmit the HO_CONNECTION_CFM message to the last target BS, or may transmit the HO_RSP message to the SS. The serving BS releases the link connected to the SS at step 1120, and terminates its handover operation.

As apparent from the above description, the present invention enables the SS based on a multi-cell structure to perform the handover operation, resulting in a guarantee of the SS's mobility. In more detail, the conventional SS performs a communication function in a single cell, such that it must cancel the link connected to a BS currently communicating with the SS when the SS moves to the other cell. Furthermore, the conventional SS must newly set up a communication mode with a new BS, such that it must newly perform the initial ranging process. However, in order to solve the aforementioned problems of the conventional SS, the present invention performs the handover process without performing the initial ranging process with the new BS, resulting in reduction of a data communication interruption time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of a terminal in a wireless communication system, the method comprising:

receiving, from a first base station, in one message, information indicating a list of one or more neighbor base station identifiers of one or more neighbor base stations, one or more frequencies of the one or more neighbor base stations, and a maximum time the one or more neighbor base stations have a pilot carrier to interference and noise ratio (CINR) less than a minimum pilot CINR;

measuring pilot CINRs of the one or more neighbor base stations;

reporting the pilot CINRs of the one or more neighbor base stations to the first base station; and selecting and accessing a second base station among one or more neighbor base stations, based on the list of the one or more neighbor base station identifiers, the one or more frequencies of the one or more neighbor base stations, and the maximum time.

2. The method of claim 1, wherein accessing the second base station comprises controlling a receiver of the terminal to use a frequency of the second base station.

3. The method of claim 1, wherein the one or more neighbor base stations are related to the one or more neighbor base station identifiers.

4. The method of claim 1, wherein accessing the second base station comprises receiving information indicating the second base station from the first base station, and
wherein the one or more neighbor base stations are related to the one or more neighbor base station identifiers.

5. The method of claim 1, wherein the information includes a carrier frequency of the one or more neighbor base stations.

6. The method of claim 1, wherein selecting and accessing the second base station comprises:
comparing a signal strength of the first base station and a signal strength of the one or more neighbor base stations; and
selecting and accessing the second base station, when the signal strength of the first base station is less than the signal strength of the one or more neighbor base stations during a preset time.

7. A method of a base station in a wireless communication system, the method comprising:
transmitting, to a terminal, in one message, information indicating a list of one or more neighbor base station identifiers of one or more neighbor base stations, one or more frequencies of the one or more neighbor base stations, and a maximum time the one or more neighbor base stations have a pilot carrier to interference and noise ratio (CINR) less than a minimum pilot CINR; and
receiving, from the terminal, pilot CINRs of the one or more neighbor base stations measured by the terminal,
wherein the terminal selects and accesses another base station among one or more neighbor base stations, based on the list of the one or more neighbor base station identifiers, the one or more frequencies of the one or more neighbor base stations, and the maximum time.

8. The method of claim 7, further comprising transmitting information indicating the another base station to the terminal,
wherein the another base station is included in the one or more neighbor base stations.

9. The method of claim 7, wherein the information includes a carrier frequency of the one or more neighbor base stations.

10. A terminal in a wireless communication system, the terminal comprising:
a receiver configured to receive, from a first base station, in one message, information indicating a list of one or more neighbor base station identifiers of one or more neighbor base stations, one or more frequencies of the one or more neighbor base stations, and a maximum time the one or more neighbor base stations have a pilot carrier to interference and noise ratio (CINR) less than a minimum pilot CINR;
a transmitter configured to report pilot CINRs of the one or more neighbor base stations to the first base station; and
a processor configured to perform operations of measuring the pilot CINRs of the one or more neighbor base stations, and selecting and accessing a second base station among one or more neighbor base stations, based on the list of the one or more neighbor base station identifiers, the one or more frequencies of the one or more neighbor base stations, and the maximum time.

11. The terminal of claim 10, wherein the processor controls the receiver to use a frequency of the second base station.

12. The terminal of claim 10, wherein the one or more neighbor base stations are related to the one or more neighbor base station identifiers.

13. The terminal of claim 10, wherein receiver receives information indicating the second base station from the first base station, and
wherein the one or more neighbor base stations are related to the one or more neighbor base station identifiers.

14. The terminal of claim 10, wherein the information includes a carrier frequency of the one or more neighbor base stations.

15. The terminal of claim 10, wherein the terminal selects and accesses the second base station by:
comparing a signal strength of the first base station and a signal strength of the one or more neighbor base stations; and
selecting and accessing the second base station, when the signal strength of the first base station is less than the signal strength of the one or more neighbor base stations during a preset time.

16. A base station in a wireless communication system, the base station comprising:
a transmitter configured to transmit, to a terminal, in one message, information indicating a list of one or more neighbor base station identifiers of one or more neighbor base stations, one or more frequencies of the one or more neighbor base stations, and a maximum time the one or more neighbor base stations have a pilot carrier to interference and noise ratio (CINR) less than a minimum pilot CINR; and
a receiver configured to receive, from the terminal, pilot CINRs of the one or more neighbor base stations measured by the terminal,
wherein the terminal selects and accesses another base station among one or more neighbor base stations, based on the list of the one or more neighbor base station identifiers, the one or more frequencies of the one or more neighbor base stations, and the maximum time.

17. The base station of claim 16, wherein the transmitter transmits information indicating the another base station to the terminal, and
wherein the another base station is included in the one or more neighbor base stations.

18. The base station of claim 16, wherein the information includes a carrier frequency of the one or more neighbor base stations.

* * * * *